United States Patent [19]
Narayanan et al.

[11] Patent Number: 5,796,906
[45] Date of Patent: Aug. 18, 1998

[54] OPTICAL PLANAR WAVEGUIDE NOTCH FILTERS

[75] Inventors: Chellappan Narayanan, Alpharetta, Ga.; Herman Melvin Presby, Highland Park, N.J.

[73] Assignee: Lucent Technologies Inc., Murray Hill, N.J.

[21] Appl. No.: 704,341

[22] Filed: Aug. 27, 1996

[51] Int. Cl.$^6$ .................................................. G02B 6/10
[52] U.S. Cl. .............................. 385/129; 385/28; 385/15
[58] Field of Search ............................. 385/15, 27, 28, 385/39, 43, 129, 130

[56] References Cited

U.S. PATENT DOCUMENTS

| | | | |
|---|---|---|---|
| 3,891,302 | 6/1975 | Dabby et al. | 385/37 |
| 4,087,159 | 5/1978 | Ulrich | 385/39 |
| 4,991,926 | 2/1991 | Pavlath | 385/126 |
| 5,224,185 | 6/1993 | Ito et al. | 385/40 |
| 5,539,845 | 7/1996 | Van Der Tol | 385/11 |

OTHER PUBLICATIONS

C.D. Poole et al. "Two-mode fibre spatial-mode converter using periodic core deformation" *Electronics Letters*, vol. 30, No. 17, pp. 1437–1438 (1994). Aug.

A. M. Vengsarkar et al, "Long-Period Fiber Gratings as Band-Rejection Filters", *Journal of Lightwave Technology*, vol. 14, No. 1, pp. 58–65 (1996). Jan.

D. Marcuse, *Light Transmission Optics* ch. 8, p. 327 (Van Nostrand Reinhold Co., N.Y., 1992). No month.

C. H. Henry, et al. "Glass Waveguides on Silicon for Hybrid Optical Packaging", 7 *J. Lightwave Technol*, pp. 1530–1539 (1989). Oct.

M. Wilkinson, et al., "D–Fiber Filter for Erbium Gain Spectrum Flattening", *Electron. Lett.*, vol. 28, pp. 131–133 (1992). Jan.

D. G. Baker *Monomode Fiber–Optic Design With Local-Area and Long–Haul Network Applications*, pp. 13–15. No month. No year.

*Primary Examiner*—John D. Lee
*Assistant Examiner*—Ellen E. Kang
*Attorney, Agent, or Firm*—Robert E. Rudnick

[57] ABSTRACT

An optical planar waveguide notch filter employs a waveguide with first, second and third regions. The first and third regions have structures for propagating an optical signal in a first transmission mode. The second region is located between the first and third regions and has a structure in which an optical signal propagates in the first transmission mode as well as at least one other higher order transmission mode. The structure of the second region further couples a particular wavelength band of the signal propagating in the first transmission mode to at least one of the other transmission modes. This coupling causes an attenuation of energy of such bandwidth in the signal propagating in the first transmission mode. As a result, the signal propagating from the second region to the third region in the first transmission mode is a notch filtered signal possessing an attenuation at the particular wavelength band.

24 Claims, 2 Drawing Sheets

5,796,906

1

OPTICAL PLANAR WAVEGUIDE NOTCH FILTERS

FIELD OF THE INVENTION

The invention relates to optical notch filters implemented in planar waveguide structures.

BACKGROUND OF THE INVENTION

Optical fiber and waveguide communication systems often employ notch filters to remove or attenuate a particular band of wavelengths of a light signal that might otherwise degrade the system performance. Exemplary applications for such notch filters include, for example, gain equalization in erbium-doped fiber amplifiers and reduction or elimination of unnecessary Stokes' frequency orders in cascaded Raman amplifier/lasers, which are further described in M. Wilkinson, et al., "D-Fiber Filter for Erbium Gain Spectrum Flattening", Electron. Lett., vol. 28, pp. 131–133 (1992), and S. G. Grubb, et al. "1.3 µm Cascaded Raman Amplifier in Germanosilicate Fibers", Proc. Optical Amplifiers Meeting, paper PD3 (Colorado, Aug. 2–5, 1994), respectively.

Although notch filters are typically devices which are connected between two optical fibers in a system, one exemplary compact notch filter comprises a photo-induced long-period grating in an optical fiber within the system. This grating-based filter operates by coupling the undesired signal wavelengths of the forward propagating fundamental guided mode in the core of the optical fiber to discrete lossy cladding modes for wavelengths satisfying the corresponding phase matching condition. As a result, the signal propagating in the fundamental guided mode of the core would have an attenuated band of frequencies corresponding to the band coupled to the lossy cladding modes. Such a grating-based filter is described in greater detail in A. M. Vengsarkar et al., "Long-Period Fiber Gratings as Band-Rejection Filters and Spectral Shape-Shifters", Proc. OFC '95, paper PD4 (San Diego, Feb. 26, 1995), which is incorporated by reference herein.

An alternative fiber-based notch filter employs periodic deformation of the fiber core to achieve coupling of a transmission mode in the core to a lossy cladding mode for attenuating an undesirable band of wavelengths in optical signals. The periodic core deformation technique provides an advantage over photo-induced grating techniques in that it can attenuate substantially larger signal bandwidths with relatively high efficiency.

Nevertheless, a need exists for even more compact notch filters that are relatively inexpensive to manufacture. Optical planar waveguide structures, such as silica optical circuits, are substantially more compact than fiber-based filters and can be manufactured at relatively low cost. The basic structure of such devices is described in C. H. Henry et al., "Glass Waveguides on Silicon for Hybrid Optical Packaging", 7 J Lightwave Technol., pp. 1530–1539 (1989). Typical silica optical circuits have core waveguide structures of doped silica glass disposed within silica glass formed on a substrate.

However, conventional planar waveguides lack the existence of discrete cladding transmission modes that are typically relied upon to produce fiber-based notch filters. Thus, the filtering technique employed in fiber-based notch filters is inapplicable to planar waveguide structures. Accordingly, a need exists for a planar waveguide notch filter configuration.

SUMMARY OF THE INVENTION

The invention concerns an optical planar waveguide notch filter. The filter employs a waveguide with first, second and third regions. The first and third regions have a structure for propagating an optical signal in a first transmission mode. In accordance with a first aspect of the invention, the second region has a structure in which an optical signal can propagate in the first transmission mode as well as at least one other higher order transmission mode that is not supported by the first and third regions. Substantially adiabatic transitions are employed between the respective regions. The waveguide structure enables propagation of an optical signal from the first region through the second region to the third region substantially in the first transmission mode.

The structure of the second region further causes coupling of a particular bandwidth of at least one wavelength of the signal propagating in the first transmission mode to at least one of the other transmission modes. In accordance with a second aspect of the invention, corrugations are employed in at least one side of the multimode waveguide to periodically vary the cross-sectional area of the waveguide and the corresponding effective index of refraction causing the coupling at the desired wavelengths. This coupling causes an attenuation of the corresponding signal bandwidth in the signal propagating in the first transmission mode. Since the higher order mode is not a mode supported by the third region, the signal propagating from the second multimode region to the third single mode region is substantially in the first transmission mode which is the signal with the attenuated wavelength band or notch filtered signal.

An exemplary embodiment of such a planar waveguide notch filter includes a first and third regions that are single transmission mode waveguide sections and a second region that is a multimode waveguide section. The multimode section can be, for example, a section having a portion with an increased cross-sectional area than the single transmission mode first and third regions, and/or a section with a greater relative index of refraction than the first and third regions. Moreover, the multi-mode waveguide section employs periodic corrugations to produce the coupling at desired wavelength. Such an optical planar waveguide can be manufactured with relatively compact dimensions. Moreover, the waveguide and corrugations can be fabricated simultaneously in a single step resulting in a manufacturing cost savings.

Additional features and advantages of the present invention will become more readily apparent from the following detailed description and accompanying drawings.

DETAILED DESCRIPTION

The invention is based on the discovery that particular optical multimode planar waveguide configurations can couple signal energy at a particular bandwidth of at least one wavelength of an optical signal propagating in a first transmission mode to at least one higher order mode. In accordance with a first aspect of the invention, these waveguide configurations are advantageously located between two planar waveguide sections that do not support such a higher order mode. This waveguide structure can couple an undesired band of at least one wavelength of an optical signal propagating in the first transmission mode to the higher order mode in the multimode section. Such coupling causes an attenuation of that wavelength band in the optical signal propagating in the first mode. Then, the optical signal with the attenuated band through a waveguide region that does not support that higher order mode to produce a correspondingly desired notch filtered optical signal propagating in the first transmission mode.

Numerous different planar waveguide configurations can be employed to produce the desirable signal coupling to form a notch filter in accordance with the invention. Accordingly, the exemplary embodiments of the invention described below with regard to the figures are for illustration purposes only and not meant to be a limitation of the invention.

Figure 1:
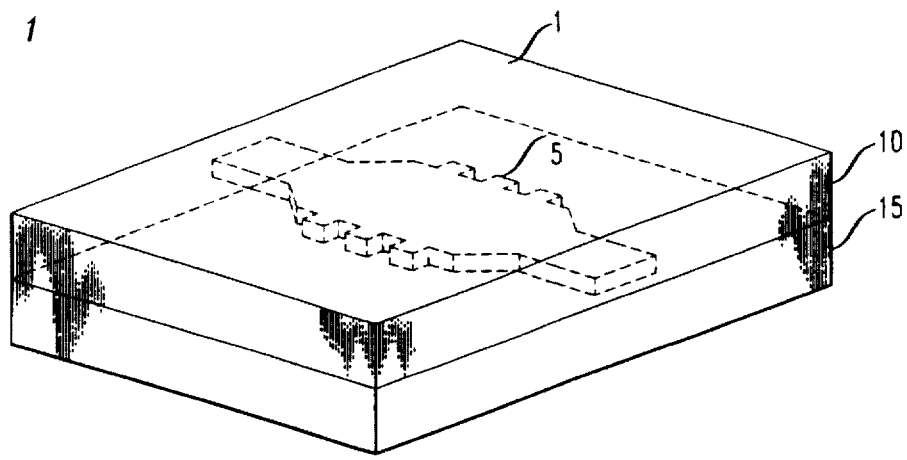
FIGS. 1 and 2 illustrate top and perspective views of a silica optical circuit containing an exemplary optical planar waveguide notch filter in accordance with the invention.
Figure 2:
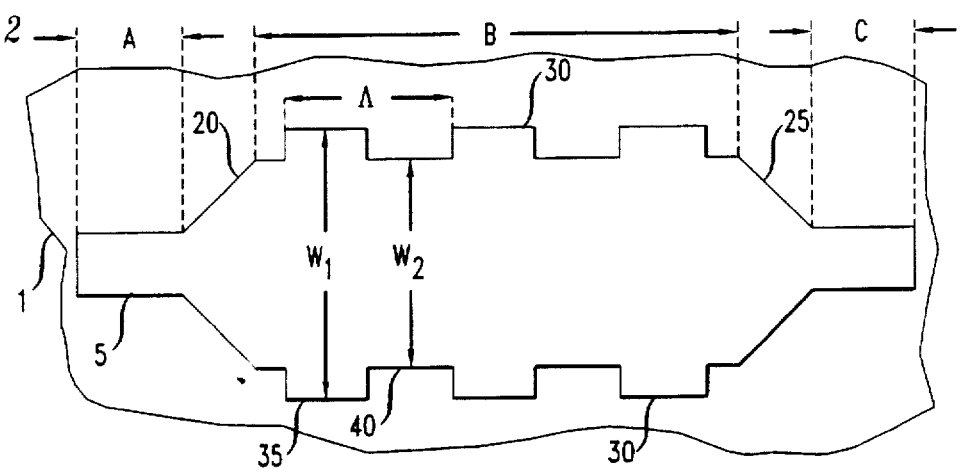

A silica optical structure 1 containing an exemplary planar waveguide notch filter 5 in accordance with the invention is shown in FIGS. 1 and 2. In FIGS. 1 and 2, the planar waveguide 5 is disposed within silica glass 10 formed on a substrate 15 such as a silicon substrate. The planar waveguide 5 comprises first, second and third regions identified with reference letters A, B and C, respectively, in FIG. 2. The first and third regions A and C include single transmission mode waveguide sections that can substantially propagate an optical signal in a single common transmission mode. The second region B includes a multiple transmission mode or multimode waveguide section that can substantially propagate an optical signal in a first transmission mode as well as at least one higher order transmission mode.

An exemplary fabrication process for the silica optical circuit 100 is as follows: a base layer of silica glass is deposited on the substrate 15 using, for example, low pressure vapor chemical deposition, and flame hydrolysis, and a thin core layer of doped silica glass is deposited on this silica glass layer; the core layer is then configured to the desired structure of the waveguide 5 using standard lithographic techniques, such as lithography, etching; and a layer of doped silica glass is then deposited over the core layer to act as a top cladding. A suitable doping profile for the doped silica glass is uniform step-index distribution. While the proceeding description relates to silica on silicon waveguide devices, it should be understood that it is possible to fabricate the circuit on other substrate materials including fused quartz, lithium niobate, ceramic or III–V materials, such as InP or GaAs.

The silica glass top cladding and the base layer of silica glass form the silica glass 10 shown in FIG. 1. Suitable thicknesses for the base silica layer, core layer and top cladding layer are 10 to 20 µm, 4 to 8 µm and 10 to 20 µm, respectively. Thicknesses less than 10 µm for the base silica layer are undesirable because of light loss to the substrate while thickness greater than 20 µm are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7 *J Lightwave Technol.*, pp. 1530–1539 (1989), which is incorporated by reference herein.

The number of transmission modes a waveguide section can propagate is determinable from the waveguides normalized frequency parameter which is commonly referred to as the V-number of the section. The V-number is based on the signal wavelength to be propagated, cross-sectional area of the waveguide and the relative refractive index difference between the waveguide and the surrounding silica glass. A common expression for the V-number follows and is described in greater detail in D. Marcuse, *Light Transmission Optics*, ch. 8, p. 327 (Van Nostrand Reinhold Co., New York, 1992), which is incorporated by reference herein.

$$V = \frac{2\Pi}{\lambda} a \sqrt{n_1^2 - n_2^2} \ ,$$

where $\lambda$ is the wavelength of a light signal, the value a is the width of the waveguide region B and the values $n_1$ and $n_2$ are the refractive indexes of the core and cladding, respectively.

Accordingly, the particular cross-sectional area of the waveguide and the relative refractive index difference between the waveguide 5 and/or the surrounding silica glass 10 is employed for the first and third waveguide regions A and C such that they transmit an optical signal over a substantially broad bandwidth in a single common transmission mode. In a similar manner, a particular cross-sectional area of the waveguide region B and/or the relative refractive index difference between the waveguide region B and the surrounding silica glass 10 is employed such that the region B can propagate a signal in the common transmission mode of the regions A and C as well as at least one higher order transmission mode.

For instance, exemplary single mode waveguide structure for the waveguide regions A and C having a width in the range of 5 µm and a height in the range of 4 µm to 8 µm as well as a common refractive index $\Delta$ that is 0.64% of the refractive index of the surrounding silica glass 10 can propagate optical signals having wavelengths in the range of, for example, 1.25 µm to 1.6 µm. Moreover, an exemplary double or multimode waveguide structure for the waveguide region B having a width in the range of 17.0 µm and a height in the range in the range of 4 µm to 8 µm as well as a common refractive index $\Delta$ of 0.64% of the surrounding silica glass 10 can likewise propagate optical signals having wavelengths in the range of, for example, 1.25 µm to 1.6 82 m. It is possible for the waveguide region B to have a length on the order of, for example, 10 mm to 15 mm to achieve such coupling.

A waveguide of a substantially constant height across the regions A, B and C as depicted in FIG. 1 can be fabricated at relatively low cost employing the previously described techniques. Also, fabricating the waveguide regions A, B and C with a substantially constant relative index of refraction can likewise be performed at relatively low cost employing conventional techniques. Accordingly, a variation in waveguide width can produce the corresponding single mode and multimode waveguide sections as shown in FIGS. 1 and 2. Thus, the depicted single mode waveguide regions A and C have a width W0 that is less than the width W1 of the multimode waveguide region B. It should be readily understood that although the depicted waveguide 5 has a rectangular cross-sectional area, various other waveguide cross-sectional areas such as, for example, oval or circular, can be employed in accordance with the invention.

Substantially adiabatically tapered sections 20 and 25 provide a transition between the respective waveguide regions A and B, and B and C to enable a light signal propagating in transmission mode of the first region A to substantially continue propagating in the first transmission mode of the second region B. Such adiabatic transitions can be of a conventional design. For instance, it is advantageous for the length of a conventional adiabatic transition to have a length in the direction of the waveguide 5 that is approximately between 10 and 100 times the wavelength conveyed in a propagated light signal.

The second waveguide region B further includes a portion containing corrugations 30 that periodically vary the width of the waveguide 5 between the width W1 and width W2 as shown at locations 35 and 40, respectively. The periodic separation of the corrugations 30 produces a corresponding periodic change in the effective index of refraction of the waveguide 5 causing energy at a particular band of at least one wavelength of an optical signal propagating in the first transmission mode to couple to the higher order mode in the second waveguide region B. The particular wavelength band coupled in the second region is based on the separation Λ of the corrugations 30 that corresponds to the intermodal coupling length which is described in detail below.

The corrugations 30 are depicted having substantially rectangular shapes that extend from a center waveguide portion for ease of illustration purposes only and it should be readily understood that such corrugations can have other shapes such as, for example, a partially or fully curved shape that varies the cross-sectional area of the waveguide section. Also, although the corrugations 30 illustrated in FIGS. 1 and 2 vary the waveguide width to achieve a variation in the waveguide cross-sectional area, it is also possible to vary other cross-sectional dimensions such as the waveguide height or combination of the waveguide height or width. In addition, if the waveguide has a substantially oval or circular cross-section, then the radius or shape of the waveguide can be periodically varied to provide periodic corrugations in accordance with the invention. Also, the number of corrugations 30 and the difference in the waveguide widths W1 and W2 determine the extent of coupling at the particular wavelength band as is described in greater detail below.

In operation, an exemplary optical signal is propagated in the transmission mode of the first waveguide region A. Such signal propagation excites the first transmission mode in the second waveguide region B due to the substantially adiabatic tapering 20 such that the signal continues to propagate through the second region B. The corrugations 30 in the second waveguide region B cause a coupling of the energy of an undesired band of at least one wavelength of the optical signal to the higher order transmission mode based on the period separation Λ of the corrugations 30. This coupling produces an attenuation or reduction in energy of that wavelength band in the optical signal propagating in the first transmission mode in the second region B.

The resulting signal with the attenuated band represents a notch filtered signal that propagates through the third waveguide region C due to the adiabatic waveguide tapering 25. The higher order signal propagating in the second region B does not propagate to the third region C because that region does not support such transmission mode. The higher order transmission mode of the second region B can be further coupled to radiation modes due to the tapering 25 which dissipate the energy of the higher order mode as radiation.

Figure 4:
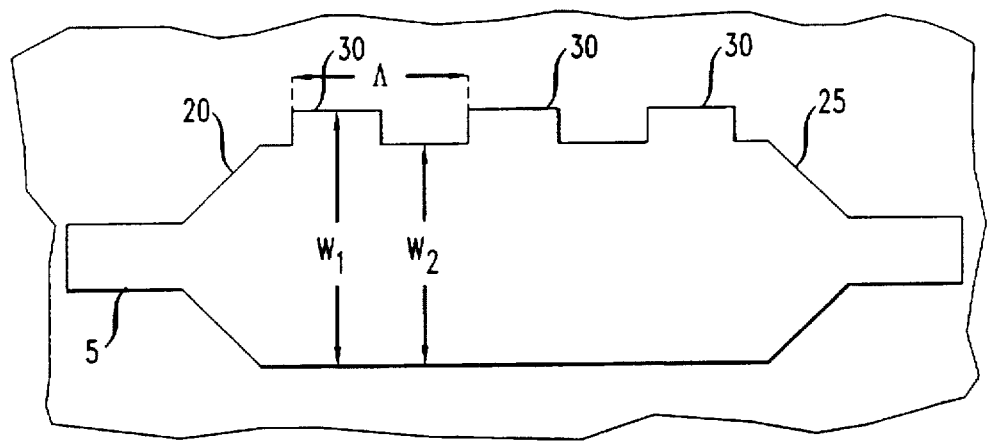
FIGS. 4 and 5 illustrate top views of alternative embodiments of the planar waveguide notch filter of FIGS. 1 and 2.

The extent of the attenuation as well as the wavelengths included in the undesired band for producing the notch filtered signal is based on the extent of the coupling of the energy of those wavelengths of the optical signal to the higher order mode in the second waveguide region B. Further, the number of corrugations 30 determines the extent of such coupling. The height of the respective corrugations 30, e.g., (W1−W2)/2 for corrugations 30 disposed on opposing sides of the waveguide as shown in FIGS. 1 and 2, or W1−W2 for corrugations 30 disposed on a single waveguide side as shown in FIG. 4, also determines the extent of such coupling. The greater the corrugation height and/or the larger the number of corrugations 30 produce corresponding increases in coupling efficiency between the first and higher order modes in the second waveguide region B. For instance, twenty-five corrugations 30 on opposing waveguide sides having heights of approximately 0.5 μm can achieve a comparable coupling performance to the use of sixteen corrugations 30 on opposing waveguide sides having heights of approximately 1.0 μm. It is possible to achieve an attenuation of the desired bandwidth of an optical signal on the order of −15 dB with a filter in accordance with the invention.

However, the use of a number of corrugations 30 below five is generally disadvantageous because typically insufficient coupling results. Also, the use of number of corrugations typically larger than thirty-five is undesirable because the coupled to the higher order mode tends to couple back down to the first mode at later corrugations in the direction of propagation through the waveguide. Moreover, corrugation heights approximately greater than 1.2 μm are typically undesirable due to resulting increased insertion loss of the light signal propagated through the waveguide. Also, corrugation heights approximately less than 0.3 μm are usually disadvantageous because of the relatively weak coupling caused by such corrugations.

It is possible to determine the number of corrugations 30 and the difference in the waveguide widths W1 and W2 for particular application in the following manner. The power transfer from the first mode to the higher order mode in the undesired wavelength band is governed by the equation:

$$\frac{P_h(L)}{P_o(O)} = \frac{c_{oh}^2}{\delta^2 + c_{oh}c_{ho}} \sin^2(\sqrt{\delta^2 + c_{oh}c_{ho}}L) ,$$

where $P_h(L)$ is the power transferred to the higher order mode after an interaction distance L along the direction of propagation. L corresponds to the length of the series corrugations $P_o(O)$ is the incident power in the first mode and, $C_{ch}$ and $C_{ho}$ are coupling coefficients to and from the fundamental mode to the higher order mode, respectively. The coefficients tend to be equal in value and are approximately equal to II/2L. Also, the value δ is a de-tuning factor which can be determined by expression:

$$\delta(\lambda) = \frac{\beta_o(\lambda) - \beta_h(\lambda) - \left(\frac{2\pi}{\Lambda}\right)}{2} ,$$

where $\beta_o$ and $\beta_h$ are the propagation constants of the fundamental mode and the higher order mode, respectively.

The detuning factor equation provides the phase matching condition. At the phase matched wavelength $\lambda_c$ when δ=o substantially maximum power would be transferred from the fundamental mode to the higher order mode. The power coupled to the higher order mode decreases for wavelengths within a particular band on either side of the phase-matched wavelengths $\lambda_c$ provided the coupling coefficient remains uniform over the region of interaction.

The length L of the series of corrugations 30 corresponds to NΛ, where N is the number of corrugations 30, can be determined for a substantially maximum power transfer from the previously recited power transfer equation with the detuning factor δ is approximately 0 to yield the equation:

$$L = \frac{n\pi/2}{\sqrt{c_{oh} c_{ho}}}$$

where $c_{oh}$ and $c_{ho}$ are wavelength dependent coupling coefficients and n is an odd numbered integer. Moreover, the periodicity or separation of the corrugation 30 can be determined from the expression:

$$\Lambda = \frac{2\pi}{\beta_o - \beta_h}$$

As a consequence, the number of periods required for substantially maximum coupling efficiency is determined to be $N = L/\Lambda$.

In addition, the full-width-half-maximum filter bandwidth, $\Delta\lambda$, is given by $$\frac{\Delta\lambda}{\lambda_o} = \frac{0.8\Lambda}{L\left[1 - \Lambda\left(\frac{dN_o}{d\lambda} - \frac{dN_h}{d\lambda}\right)\right]_{\lambda=\lambda_o}}$$

where $N_o$ and $N_h$ are the effective indices of the first and the higher order mode. Thus, the filter bandwidth is determined by the length of the grating L, and the dispersion properties of the first and the coupled higher order mode. Moreover, the notch-band of the filter can be arbitrarily shaped by adjusting the corrugation height along the length of the grating, which will change the coupling coefficient.

Figure 3:
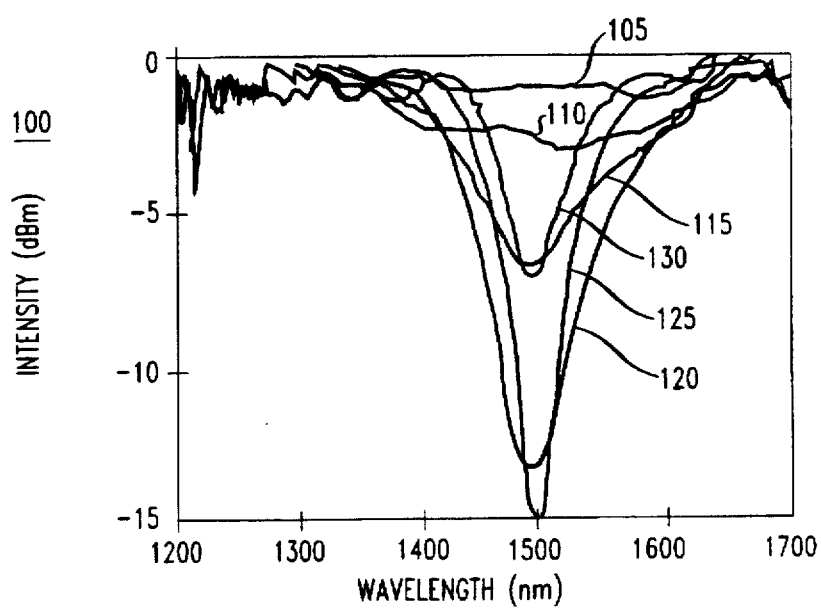
FIG. 3 illustrates an graph depicting exemplary signal attenuation's achieved employing different numbers of symmetrical corrugations in the notch filter of FIG. 1.

A graph 100 representing the differences in attenuation at particular wavelengths and the corresponding bandwidth of the notch of the exemplary waveguide 5 of FIGS. 1 and 2 with differing numbers of corrugations is represented in FIG. 3. In FIG. 3, relative intensities 105, 110, 115, 120, 125 and 130 of notch filtered output signals based on an input optical signal having a power of 0 dBm across a band of 1200 nm to 1700 nm is shown for the use of 5, 10, 15, 20, 25 and 30 symmetrical corrugations per waveguide side. The corresponding filtered signal intensities 105, 110, 115, 120, 125 and 130 correspond to the symmetrical number of corrugations per side of 5, 10, 15, 20, 25 and 30, respectively.

Referring to FIG. 3, the use of twenty-five symmetrical corrugations per side achieves a notch filter attenuation of approximately 15 dB at a signal wavelength 1500 nm and an attenuation of greater than 10 dB over the wavelength range of 1485 to 1515. The use of 20 symmetrical corrugations per side achieves a notch filter attenuation of greater than 10 dB over a broader wavelength range of 1477 to 1519 as shown by the intensity 120. Moreover, the use of 30 symmetrical corrugations per side achieves a relatively flat notch filter attenuation of exceeds 5 dB over the wavelength range of 1481 to 1412 as shown by the intensity 130.

The use of symmetrical corrugations 30 on two sides of the waveguide 5 for varying the width of the waveguide section between widths of W1 and W2 causes coupling from the first mode to higher order symmetrical modes. Symmetrical higher order transmission modes are even numbered modes. Asymmetrical corrugations or corrugations 30 disposed on a single side of the waveguide 5 can be employed to provide coupling to asymmetrical or symmetrical higher order transmission modes. Asymmetrical higher order transmission modes are odd numbered transmission modes. An exemplary waveguide configuration having corrugations 30 disposed on a single side of the waveguide 5 is depicted in FIG. 4. Similar features of the waveguides of FIGS. 1, 2 and 4 have been like numbered for clarity. The extent of the coupling in the second region B of the waveguide 5 can be determined from the previously described expressions.

However, it should be understood that the use of asymmetrical corrugations 30, as shown in FIG. 4, having a particular height would produce greater insertion loss than the comparable symmetrical corrugations 30, as shown in FIGS. 1 and 2, that are half that particular height. For instance, a filter according to the invention with twenty-five asymmetrical corrugations 30 having a height of 1.0 µm would have an insertion loss on the order of 0.02 dB, while a comparable filter with twenty-five symmetrical corrugations 30, as shown in FIG. 2, having a height of 0.5 µm would have a substantially lower insertion loss of 0.005 dB.

The exemplary embodiments depicted in FIGS. 1, 2 and 4 rely on an increased waveguide cross-sectional area in the second region B to enable propagation of multiple transmission modes as described with respect to the previous recited equation 1. In such embodiments the relative material index of refraction of the waveguides 5 across the regions A, B and C are substantially identical while the corrugations 30 cause variations in the effective refractive index. However, it is also possible to propagate such multiple transmission modes by employing an increased relative material index of refraction of the waveguide region B compared to that of the waveguide regions A and C while using a corresponding appropriate cross-sectional area for the waveguide region B. It is possible for such cross-sectional area to be less than, equal to, or larger than the cross-sectional areas of the waveguide 5 in the regions A and C based on the corresponding relative index of refraction of the respective regions A, B and C.

Figure 5:
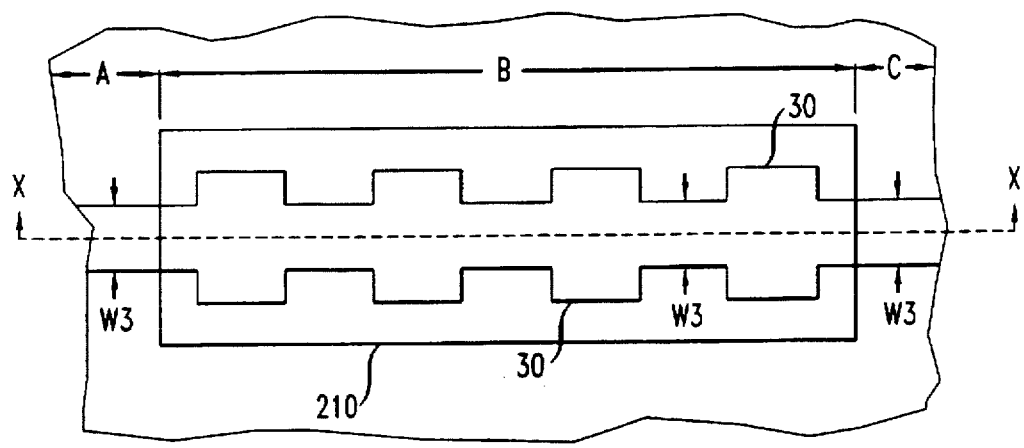
Figure 6:
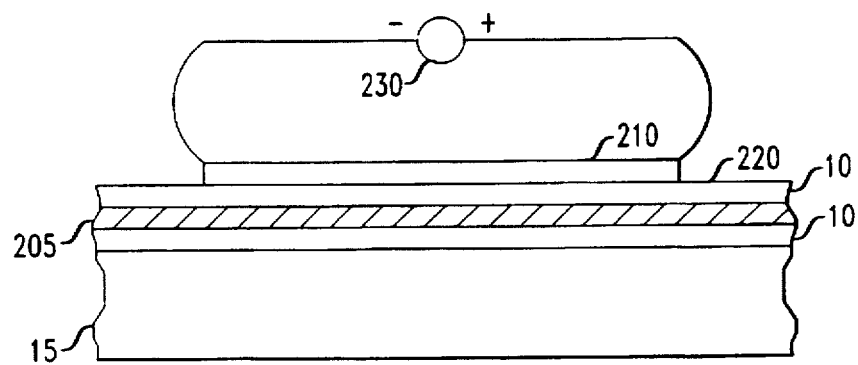
FIG. 6 illustrates a cross-sectional view of the planar waveguide notch filter of FIG. 5.

It is possible to fabricate a planar waveguide notch filter with differing relative material indexes of refraction along its length. However, it is also possible to use a waveguide fabricated with the waveguide regions A, B and C employing substantially the same relative material index of refraction and elevating the temperature of the waveguide in the region B to increase its index of refraction. An exemplary planar waveguide notch filter 205 that elevates the temperature in the second waveguide region B while maintaining similar waveguide cross-sectional areas in respective regions A, B and C is illustrated in FIGS. 5 and 6. Similar features in FIGS. 1, 2, 5 and 6 are referred to by like numbers and letters for clarity, for example, the regions A, B and C, and the corrugations 30.

In FIG. 5, the waveguide 205 employs the same cross-sectional dimensions including a width W3 for the waveguide regions A, B and C. Exemplary widths for such waveguide regions A, B and C include 4 µm to 8 µm for propagating signals with wavelengths in the range of 1.25 µm to 1.6 µm. However, a portion of the region B further include the corrugations 30 which vary the waveguide width between W3 and W4 at the period separation $\Lambda$ to provide coupling of the undesired wavelength band. Exemplary variations between waveguide widths W3 and W4 can be such that corresponding corrugation heights are, for example, in the approximate range of 0.5 µm to 1.0 µm. Also, the waveguide 205 has been depicted with symmetrical corrugations 30 for coupling to symmetrical higher order modes for ease of illustration purposes only. It should be readily understood that asymmetrical corrugations on a single waveguide side can be employed for coupling to symmetrical or asymmetrical higher order modes in accordance with the invention.

It is possible to employ a heater 210, such as a conventional chromium heater, on a top surface 220 of the silica optical structure which is best seen in the cross-sectional view of FIG. 6 which taken along the axis indicated by x in FIG. 5. As shown in FIG. 6, the heater 210 can be connected to a power source 230, such as a conventional battery.

It is alternatively possible to elevate the temperature by other techniques, such as using radiation from a light source that produces light absorbed by the silica glass 10. For instance, lasers, such as $CO_2$ laser, or LED's can be employed that emit light having a wavelength in the range of 5 to 12 µm which is substantially absorbed by the silica glass 10 and substantially transmitted through the silicon substrate 15. Silica glass has an index of refraction of approximately 1.450 for a wavelength of approximately 1 µm at 0° C. which increases to approximately 1.451 when heated to 100° C.

Although the coupling of the undesired wavelength band is achieved in the multimode region using corrugations for the providing the periodic changes in the effective refractive index of the waveguide 5 in the previously described FIGS. 1, 2, 4 and 5, it is alternatively possible to provide such periodic variation in the refractive index by, for example, ultra-violet light induced gradients in the multimode waveguide section in accordance with the invention.

A notch or band-rejection filter that attenuates relatively large bands can be formed by cascading a plurality of the planar notch filters one or more optical circuits where each cascaded filter attenuates signals in a particular portion of the undesired band. Also, the notch band shape can be adjusted by employing different corrugation heights in the multimode waveguide region as well as different lengths of and between corrugations. Such variations produce corresponding variations in the effective refractive index of the waveguide at such intervals.

Although several embodiments of the invention have been described in detail above, many modifications can be made without departing from the teaching thereof. All of such modifications are intended to be encompassed within the following claims. For instance, although the depicted regions A and C are described as single mode waveguide sections, it is alternatively possible, albeit less desirable, to employ multimode waveguide sections for the regions A and C that support at least one common transmission mode and that do not support the higher order mode of the waveguide region B. Also, although planar waveguide notch filters are shown in FIGS. 1, 2, 4, 5 and 6 as individual silica optical circuits, it is possible to form silica optical circuits containing a plurality of interconnected circuit elements including a planar waveguide notch filter in accordance with the invention to achieve enhanced isolation in a particular filter application.

The invention claimed is:

1. A planar waveguide notch filter comprising:
   a planar waveguide disposed within a cladding, said planar waveguide having first, second and third regions, said first and third regions having a structure for propagating an optical signal in a first transmission mode and said second region disposed between said first and third regions and having a structure for propagating an optical signal in a corresponding first transmission mode and at least one other transmission mode, wherein said second region further has a structure such that signal energy of a particular band of at least one wavelength of a signal propagating from said first region through to said third region is coupled in said second region from said first transmission mode to said at least one other transmission mode to attenuate said band of said signal propagating to said third region.

2. The filter of claim 1 wherein at least a portion of said second region has substantially periodic variations in effective index of refraction along said waveguide based on said wavelength band to be coupled.

3. The filter of claim 2 wherein said variations in the effective refractive index is produced by substantially periodic variations in cross-sectional area along said waveguide.

4. The filter of claim 3 wherein corrugations formed along said waveguides provide said variations in waveguide cross-sectional area.

5. The filter of claim 4 wherein at least a portion of said second waveguide region has a substantially rectangular cross-sectional area and said corrugations are formed along at least one side of said waveguide portion.

6. The filter of claim 5 wherein said corrugations are formed along one side of said waveguide portion.

7. The filter of claim 5 wherein said corrugations are formed along two sides of said waveguide portion.

8. The filter of claim 5 wherein said corrugations have a substantially common height.

9. The filter of claim 5 wherein at least one of said corrugations has a different height than other of said corrugations.

10. The filter of claim 4 wherein corrugations have heights in the range of 0.5 µm to 1.0 µm.

11. The filter of claim 4 wherein a number of corrugations on a waveguide side is in the range of 5 to 35.

12. The filter of claim 1 wherein at least a portion of said second region of said waveguide has a particular cross-sectional area greater than a cross-sectional area of said first and third waveguide regions.

13. The filter of claim 12 wherein said waveguide is substantially adiabatically tapered between said first and second regions and said second and third regions.

14. The filter of claim 1 wherein at least a portion of said second region has a relative index of refraction greater than the index of refraction of the first and third waveguide regions.

15. The filter of claim 14 wherein said portion of said second region has a waveguide cross-sectional area substantially the same as the cross-sectional area of said first and third regions.

16. The filter of claim 14 further comprising at least one heater element disposed proximate the second region wherein the first, second and third regions are fabricated with substantially the same relative index of refraction and said heater element is for heating said second region to cause a greater relative index of refraction in said region.

17. The filter of claim 1 wherein the filter is a silica optical circuit.

18. An optical band rejection filter comprising a plurality of connected filters of the type of claim 1.

19. A method for notch filtering an optical signal comprising:
   transmitting an optical signal in a first transmission mode through a first single mode region of a planar waveguide to a multi-mode region of said waveguide;
   coupling energy of said signal at a band of at least one wavelength from said first transmission mode to at least one other higher order transmission mode in said second region, said coupling causing an attenuation of said portion of said signal transmitted in said first transmission mode within said second region; and
   conveying said signal with said attenuated portion in said first transmission mode to a second single mode region of said waveguide that substantially does not propagate signals in said higher order mode.

20. The method of claim 19 further comprising substantially coupling said higher order transmission mode in which said coupled signal is propagating to at least one radiation mode.

21. The method of claim 20 wherein said higher order transmission mode is an immediate next higher transmission mode than said first transmission mode.

22. The method of claim 20 wherein said higher order transmission mode is an immediately second higher transmission mode than said first transmission mode.

23. The method of claim 20 wherein said coupling step is performed by providing at least a portion of said second region with substantially periodic variations in an effective index of refraction along said waveguide.

24. The method of claim 20 wherein said variation in the effective refractive index is provided by substantially periodic variations in cross-sectional area along said waveguide.

* * * * *